(No Model.)
W. L. DECKER.
VELOCIPEDE.
No. 546,954.  Patented Sept. 24, 1895.
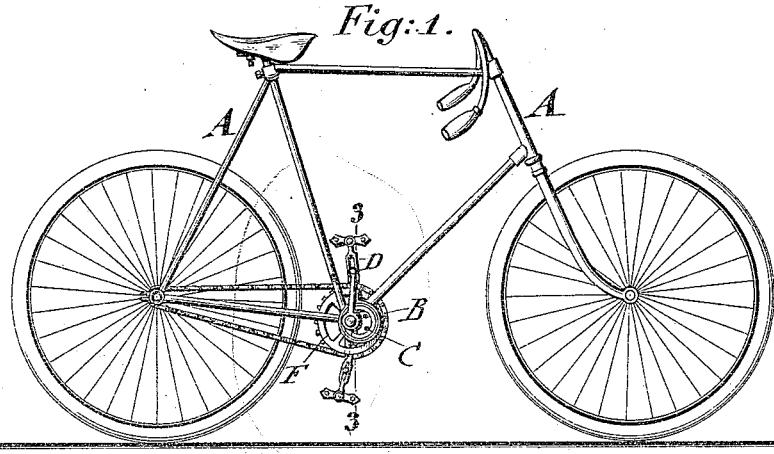
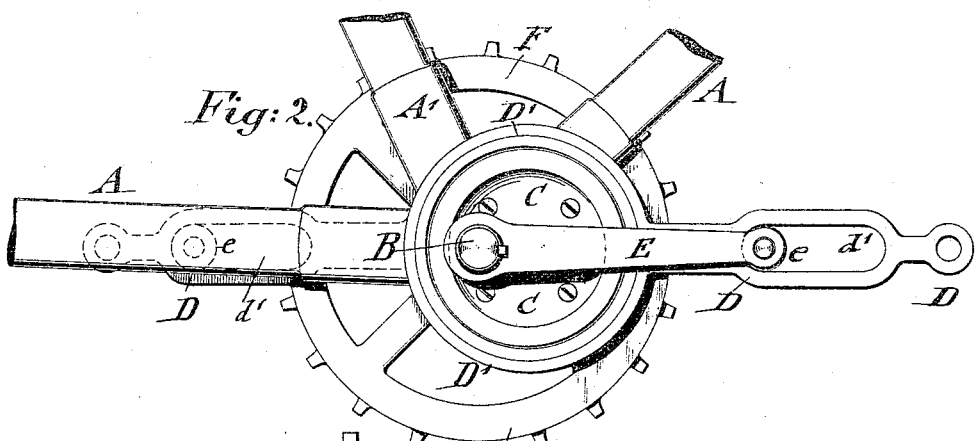
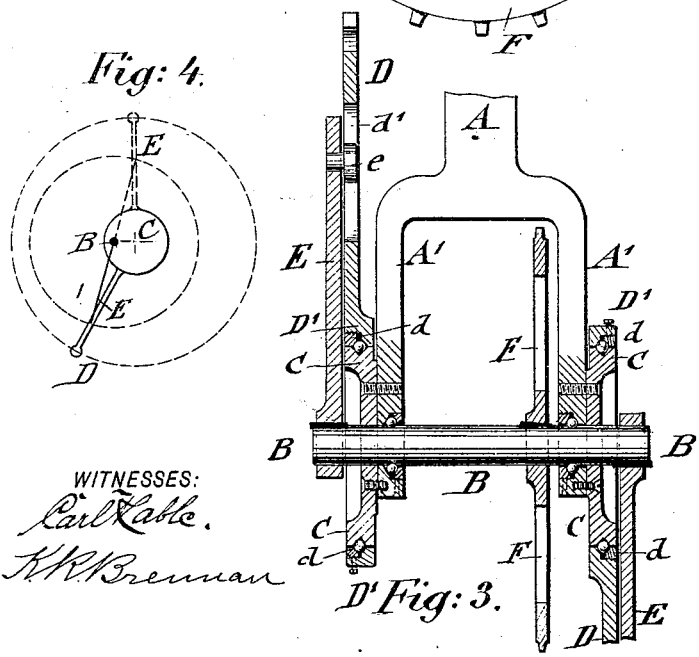
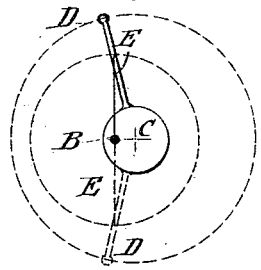
WITNESSES:
Carl Kable.
K. K. Brennan
INVENTOR
William L. Decker
BY
Sperry & Raegener
ATTORNEYS.

UNITED STATES PATENT OFFICE.

WILLIAM L. DECKER, OF WORCESTER, MASSACHUSETTS, ASSIGNOR TO THE DECKER CYCLE COMPANY, OF SAME PLACE.

VELOCIPEDE.

SPECIFICATION forming part of Letters Patent No. 546,954, dated September 24, 1895.

Application filed March 15, 1894. Renewed April 8, 1895. Serial No. 545,010. (No model.)

*To all whom it may concern:*

Be it known that I, WILLIAM L. DECKER, a citizen of the United States, and a resident of Worcester, in the county of Worcester and State of Massachusetts, have invented certain new and useful Improvements in Velocipedes, of which the following is a specification.

This invention relates to an improved crank mechanism especially adapted for velocipedes.

The object of the invention is to secure the advantage of compound leverage in driving the vehicle.

The invention consists principally in the combination with the crank-shaft and sprocket-gearing of the velocipede of stationary eccentrics disposed with their longer radii forward of the crank-shaft, two sets of compound levers of different lengths for operating the crank-shaft, and means at the outer ends of the longer levers for applying power thereto, the shorter levers being rigidly connected to said shaft and the longer levers being adapted to turn on said eccentrics, the longer levers having sliding connections with the shorter levers between their fulcrums and the power-points of the longer levers, and said sliding connections of the opposite sets being always on a diametrical line passing through the shaft. In the following description the short levers are designated as crank-arms and the longer levers as cranks. In this construction a compound leverage is obtained during the movement of the pedals through that part of their circuit in which the power is applied and a gain in power is thus secured which is not lost through the other part of the circuit, since in bicycle-driving no power is applied to the crank except on the downstroke.

In the accompanying drawings, Figure 1 represents a side elevation of a bicycle with my improved crank-motion. Fig. 2 is a side elevation of the crank-motion, showing the connection of the cranks with the crank-shaft and with the motion-transmitting sprocket-wheel, said figure being drawn on a larger scale. Fig. 3 is a vertical transverse section on line 3 3, Fig. 1, also drawn on a larger scale, and Figs. 4 and 5 are diagrams showing the cranks and crank-arms in their relative positions to each other as they pass respectively over their dead-centers.

Similar letters of reference indicate corresponding parts.

Referring to the drawings, A represents the supporting-frame of a bicycle of any approved construction, the forked lower part A' of which is provided with suitable bearings in which the crank-shaft B is supported. To opposite sides of the forked part A' are attached stationary disks C, by means of screws or otherwise, as shown clearly in Fig. 3, said disks being disposed eccentrically to the crank-shaft in such a manner that the longer radius of each is in front of, while the shorter radius is at the rear of, the crank-shaft, as shown clearly in Fig. 2.

On the stationary eccentrics C are mounted the strap-shaped ends D' of the cranks D, said straps being applied to the eccentrics by means of antifriction-balls, which are retained in position by means of a ring-shaped collar $d$ that is screwed into the shouldered and threaded straps D' of the cranks D.

The cranks D have sliding connections with the crank-arms E, and these sliding connections of the opposite sets are always on a diametrical line passing through the shaft, maintaining these relative positions throughout their rotations around the shaft. To effect the sliding connection of each crank with its companion crank-arm in the manner shown in the drawings the middle portions of the cranks D are provided with the slots $d'$, which are engaged by antifriction-rollers $e$ at the outer ends of the connecting crank-arms E, that are keyed at their inner ends to the crank-shafts B. The cranks D extend beyond the crank-arms E, where they are provided at or near their outer ends with means for applying power thereto—as, for instance, with pedals, as P.

The motion-transmitting sprocket-wheel F is keyed to the crank-shaft B, preferably at the inside of the forked lower end A' of the frame A, so as to be out of the way of the actuating parts and still in a position to be connected with the sprocket-wheel on the axle of the rear wheel in the customary manner. A stationary eccentric C and connecting crank-rod E is preferably arranged on each side of the crank-shaft B, so that by the downward motion of each pedal the leverage of each crank is compounded and thereby a very powerful and effective action exerted on the crank-shaft at each downward stroke of the crank. This is transmitted by the connecting crank-rods to the crank-axle, and from the same by the sprocket-wheel and chain transmission to the axle of the rear wheel. During the downward motion of the crank, which constitutes a long lever, the roller at the end of the crank-arm, which constitutes a short lever, is moved in the slotted portion of the crank toward the inner end of the same, while simultaneously the roller at the end of the opposite crank-arm is moved in the slotted portion of the opposite crank toward the outer end of the slotted portion of the crank. Upon the downward motion of the crank the leverage is compounded by the eccentricity of the disk and the connecting crank-arm and thereby increased force imparted to the crank-shaft. It thus appears that by the lengthening of the leverage of the cranks during the downward motion of the pedals an increased power is obtained, whereby the speed of the velocipede may be considerably increased without requiring additional effort in imparting motion to the same.

Having thus described my invention, I claim as new and desire to secure by Letters Patent—

1. In a velocipede, the combination of a crank shaft, two similar sets of compound levers of different lengths for operating said crank shaft, the shorter levers being attached to said shaft, eccentrics on which the longer levers turn, the longer levers having sliding connections with the shorter levers and said sliding connections of the opposite sets being always on a diametrical line passing through the shaft, and means for applying power to the longer levers, substantially as described.

2. The combination in a velocipede of a supporting frame, a crank shaft supported in bearings of said frame, stationary eccentrics attached to the supporting frame and having their longer radii disposed forward of the crank shaft, crank arms fixed at their inner ends to the crank shaft, cranks extending beyond and connected with said crank arms and provided with straps engaging said eccentrics, the cranks having sliding connections with their respective crank arms, and said sliding connections being always in a diametrical line passing through the shaft, the cranks being provided with means whereby power is applied thereto, substantially as described.

3. The combination of a supporting frame having a lower forked part, a crank shaft supported in bearings of said forked part, stationary disks attached to the lower forked part eccentrically to the crank shaft, cranks connected by straps to said disks and movable thereon, said cranks being provided with slotted middle portions, crank arms fastened to the crank shaft and connected by anti-friction rollers with the slotted portions of the cranks, said cranks extending beyond said crank arms, and means for applying power to said cranks, substantially as described.

4. The combination of a velocipede frame, wheels supporting said frame, a sprocket pinion for communicating motion to one of said wheels, a driving crank shaft supported in said frame, a sprocket wheel on said driving shaft, a sprocket chain connecting said sprocket wheel and sprocket pinion, two similar sets of compound levers of different lengths for operating the crank shaft, the shorter levers being rigidly connected with said crank shaft, eccentrics on which the longer levers turn, said eccentrics having their longer radii disposed forward of the crank shaft, and pedals attached to the longer levers, the longer and shorter levers of each set having a sliding connection between their fulcrums and the pedal on the longer lever, and the connections on the opposite sets being always on a diametrical line passing through the center of the shaft.

5. In a velocipede, the combination of a shaft, a fixed eccentric disposed with its longer radius in front of said shaft, a crank adapted to rotate on said eccentric, a crank arm fixed to said shaft, a sliding connection between said crank and crank arm, and means for applying power to said crank at a point beyond said sliding connection, said crank and crank arm moving in unison in their rotation around their centers, substantially as described.

In testimony that I claim the foregoing as my invention I have signed my name in presence of two subscribing witnesses.

WILLIAM L. DECKER.

Witnesses:
PAUL GOEPEL,
K. R. BRENNAN.